(12) United States Patent
Kidera et al.

(10) Patent No.: US 9,515,577 B2
(45) Date of Patent: Dec. 6, 2016

(54) POWER CONVERSION DEVICE

(71) Applicant: Panasonic Intellectual Property Management Co., Ltd., Osaka (JP)

(72) Inventors: Kazunori Kidera, Osaka (JP); Hideki Tamura, Shiga (JP); Ichirou Katou, Shizuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 112 days.

(21) Appl. No.: 14/436,376

(22) PCT Filed: Sep. 20, 2013

(86) PCT No.: PCT/JP2013/005560
§ 371 (c)(1),
(2) Date: Apr. 16, 2015

(87) PCT Pub. No.: WO2014/064884
PCT Pub. Date: May 1, 2014

(65) Prior Publication Data
US 2015/0288296 A1 Oct. 8, 2015

(30) Foreign Application Priority Data

Oct. 23, 2012 (JP) ................................ 2012-233792

(51) Int. Cl.
*H02M 7/538* (2007.01)
*H02M 7/5387* (2007.01)
*H02M 7/48* (2007.01)
*H02M 1/00* (2006.01)

(52) U.S. Cl.
CPC .......... *H02M 7/53871* (2013.01); *H02M 7/48* (2013.01); *H02M 7/5387* (2013.01); *H02M 2001/007* (2013.01)

(58) Field of Classification Search
CPC ................ H02M 2001/007; H02M 2001/123; H02M 7/48; H02M 7/5387; H02M 7/53871; H02M 7/797
See application file for complete search history.

(56) References Cited

U.S. PATENT DOCUMENTS

| 2005/0063202 A1* | 3/2005 | Stancu | ................ | H02M 1/12 363/40 |
| 2005/0063205 A1* | 3/2005 | Stancu | .............. | H02M 7/53875 363/132 |

(Continued)

FOREIGN PATENT DOCUMENTS

| JP | H07-163153 A | 6/1995 |
| JP | 09-121559 A | 5/1997 |

(Continued)

OTHER PUBLICATIONS

International Search Report for corresponding International Application No. PCT/JP2013/005560 mailed Dec. 3, 2013.

(Continued)

*Primary Examiner* — Adolf Berhane
*Assistant Examiner* — Henry Lee, III
(74) *Attorney, Agent, or Firm* — Renner, Otto, Boisselle & Sklar, LLP (57) ABSTRACT

There is provided a device including: an inverter 5 including switching elements 51-52 for outputting a U-phase voltage and switching elements 53-54 for outputting a W-phase voltage; midpoint capacitors 31-32; a midpoint stabilizer 2 configured to regulate a power storage amount of each of the midpoint capacitor 31 and the midpoint capacitor 32; and a controller 7 configured to control the switching elements 51-54 so as to supply a desired U-phase voltage and a desired W-phase voltage based on voltages between the U-phase voltage line and the neutral line and the voltage between the W-phase voltage line and the neutral line, and control the midpoint stabilizer 2 so as to adjust the midpoint potential in the O phase based on the condition of the midpoint potential in an O phase at a connecting point between the midpoint capacitor 31 and the midpoint capacitor 32.

7 Claims, 4 Drawing Sheets

(56) References Cited

U.S. PATENT DOCUMENTS

| | | | |
|---|---|---|---|
| 2006/0067092 A1* | 3/2006 | Nondahl | H02M 5/458 363/37 |
| 2006/0245216 A1* | 11/2006 | Wu | H02M 7/487 363/13 |
| 2008/0239775 A1 | 10/2008 | Oughton et al. | |
| 2011/0170322 A1* | 7/2011 | Sato | H02J 9/062 363/40 |
| 2013/0051105 A1* | 2/2013 | Wang | H02M 7/5387 363/132 |

FOREIGN PATENT DOCUMENTS

| | | |
|---|---|---|
| JP | 10-234185 A | 9/1998 |
| JP | 10-295084 A | 11/1998 |
| JP | 2001-197757 A | 7/2001 |
| JP | 2012-170189 A | 9/2012 |
| WO | WO 2008/117166 A2 | 10/2008 |

OTHER PUBLICATIONS

Form PCT/ISA/237 for corresponding International Application No. PCT/JP2013/005560 dated Dec. 3, 2013.

International Preliminary Report on Patentability for corresponding International Application No. PCT/JP2013/005560 dated Jul. 15, 2014.

Extended European Search Report dated May 27, 2016 for corresponding European Application No. 13849519.7.

\* cited by examiner

POWER CONVERSION DEVICE

TECHNICAL FIELD

The present invention relates to power conversion devices.

BACKGROUND ART

There is known a single-phase three-wire output inverter as disclosed in Patent Document 1. This inverter includes three arms, and one of three-phase output terminals of inverter bridges is a neutral phase (O phase) of which a current command is constantly zero. In the inverter, current commands of the remaining two phases (U phase, W phase) other than the neutral phase (O phase) are sinusoidal current commands having a mutual phase difference of 180°. Thus, the inverter obtains single-phase three-wire PWM output voltage.

In the case of domestic wiring of the inverter, the O phase is subjected to ground connection to a pole transformer. When the inverter is activated, an output voltage of the inverter varies between a voltage between the O phase and the U phase and a voltage between the O phase and the W phase. This action is a variation of the entire potential of the inverter with respect to the ground potential of the O phase, which easily causes waveform distortion. In addition, the conventional inverter cannot deal with various types of loads such as a half-wave rectified load.

The present invention has been made in view of the above-described circumstances. An object of the present invention is to provide a single-phase three-wire power conversion device capable of dealing with various types of loads and suppressing waveform distortion.

CITATION LIST

Patent Document

Patent Literature 1: Japanese Unexamined Patent Application Publication No. H07-163153 (Japanese Patent No. 3337041)

SUMMARY OF THE INVENTION

A power conversion device according to a first aspect of the present invention includes: an inverter including a first switching element and a second switching element for outputting a voltage between a first voltage line and a neutral line in a single-phase three-wire system, and a third switching element and a fourth switching element for outputting a voltage between a second voltage line and the neutral line in the single-phase three-wire system; a first midpoint capacitor connected to a DC power output bus and the neutral line; a second midpoint capacitor connected to the DC power output bus and the neutral line; a first voltage detector configured to detect a condition of a midpoint potential in the neutral line at a connecting point between the first midpoint capacitor and the second midpoint capacitor; a second voltage detector configured to detect the voltage between the first voltage line and the neutral line and the voltage between the second voltage line and the neutral line; a midpoint stabilizer configured to regulate a power storage amount of each of the first midpoint capacitor and the second midpoint capacitor; and a controller configured to control the first switching element, the second switching element, the third switching element and the fourth switching element so as to supply a desired voltage from between the first voltage line and the neutral line and a desired voltage from between the second voltage line and the neutral line based on the respective voltages detected by the second voltage detector, and control the midpoint stabilizer so as to adjust the midpoint potential in the neutral line based on the condition of the midpoint potential detected by the second voltage detector.

A power conversion device according to a second aspect of the present invention is the power conversion device according to the first aspect, wherein the controller controls the midpoint stabilizer in a manner such that the midpoint potential in the neutral line is a midpoint of a voltage waveform between the first voltage line and the second voltage line, and the controller controls the inverter so as to output a voltage waveform of a desired frequency from between the first voltage line and the second voltage line.

A power conversion device according to a third aspect of the present invention is the power conversion device according to the second aspect, wherein the controller controls the inverter in a manner such that a total value of the voltage output from between the first voltage line and the neutral line and the voltage output from between the second voltage line and the neutral line results in zero.

A power conversion device according to a fourth aspect of the present invention is the power conversion device according to the second or third aspect, wherein the controller controls the midpoint stabilizer in a manner such that the midpoint potential in the neutral line is a midpoint of a desired voltage of the DC power output bus.

A power conversion device according to a fifth aspect of the present invention is the power conversion device according to any one of the first to fourth aspects, wherein the midpoint stabilizer includes a fifth switching element and a sixth switching element connected to the DC power output bus, and a reactor connected to midpoints between the fifth switching element and the sixth switching element and between the first midpoint capacitor and the second midpoint capacitor, and the controller opens and closes the fifth switching element and the sixth switching element based on the condition of the midpoint potential detected by the first voltage detector so as to regulate the power storage amount of each of the first midpoint capacitor and the second midpoint capacitor.

A power conversion device according to a sixth aspect of the present invention is the power conversion device according to any one of the first to fourth aspects, wherein the midpoint stabilizer includes a first discharge portion including a first resistance and a seventh switching element connected in parallel with the first midpoint capacitor and a second discharge portion including a second resistance and an eighth switching element connected in parallel with the second midpoint capacitor, and the controller opens and closes the seventh switching element of the first discharge portion and the eighth switching element of the second discharge portion based on the condition of the midpoint potential detected by the first voltage detector so as to regulate the power storage amount of each of the first midpoint capacitor and the second midpoint capacitor.

A power conversion device according to a seventh aspect of the present invention is the power conversion device according to the first aspect, wherein the first midpoint capacitor and the second midpoint capacitor each have a capacity depending on output power of the inverter so as to adjust a potential in the neutral line to a predetermined potential.

A power conversion device according to an eighth aspect of the present invention includes: an inverter including a first switching element and a second switching element for outputting a voltage between a first voltage line and a neutral line in a single-phase three-wire system, a third switching element and a fourth switching element for outputting a voltage between a second voltage line and the neutral line in the single-phase three-wire system, and a fifth switching element and a sixth switching element connected to the neutral line and a DC power output bus; a voltage detector configured to detect a first voltage between the first voltage line and the neutral line and a second voltage between the second voltage line and the neutral line; and a controller configured to control the first switching element, the second switching element, the third switching element and the fourth switching element so as to supply a desired voltage from between the first voltage line and the neutral line and a desired voltage from between the second voltage line and the neutral line based on the respective voltages detected by the voltage detector, and control the fifth switching element and the sixth switching element so as to adjust the midpoint potential in the neutral line based on the first voltage and the second voltage detected by the voltage detector.

DESCRIPTION OF EMBODIMENTS

Hereinafter, embodiments of the present invention will be explained with reference to the drawings.

Figure 1:
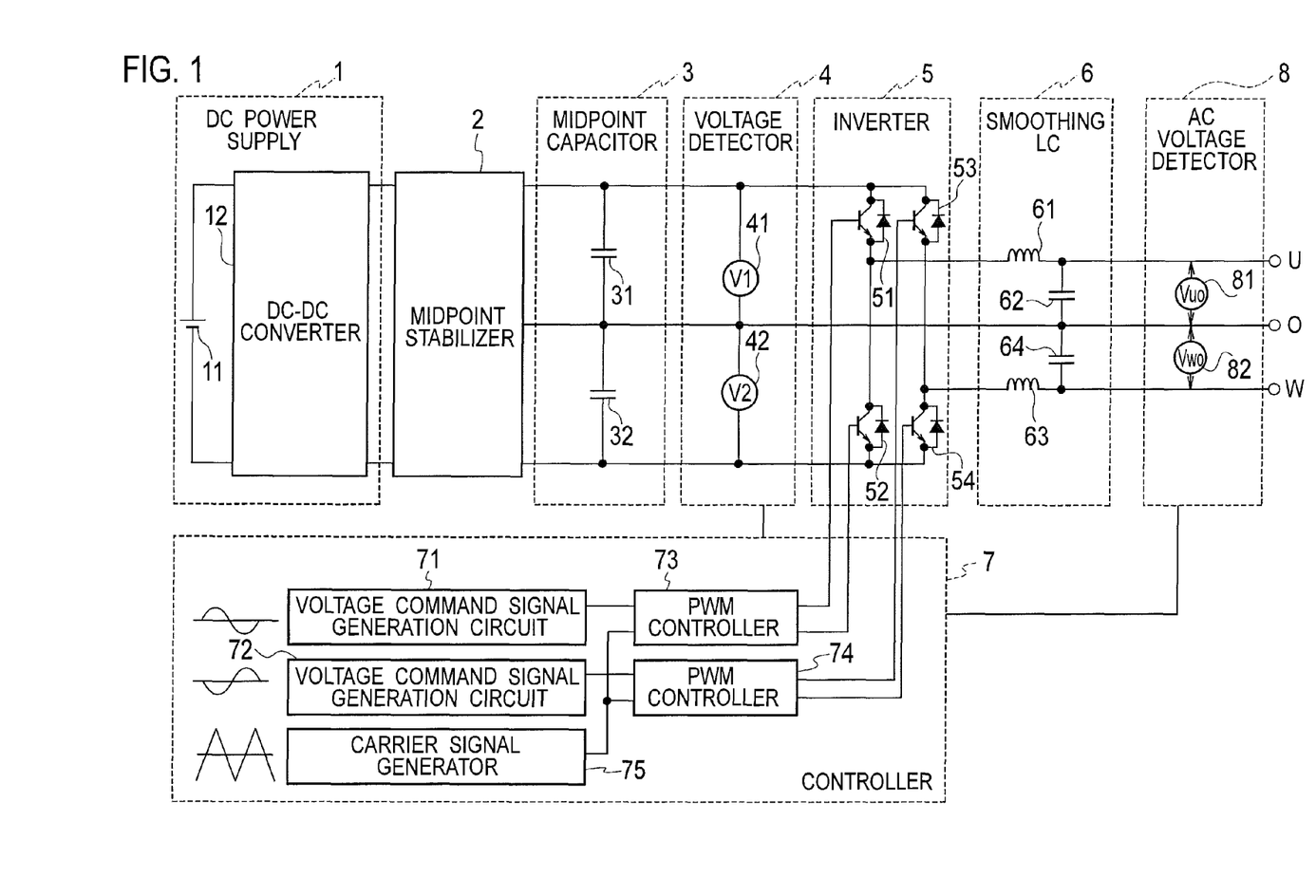
FIG. 1 is a circuit diagram showing a configuration of a power supply system according to an embodiment of the present invention.

A power supply system according to an embodiment of the present invention has a configuration, for example, as shown in FIG. 1. The power supply system includes a power conversion device connected to a DC power supply 1.

The power conversion device includes a midpoint stabilizer 2, a midpoint capacitor 3, a voltage detector (first voltage detector) 4, an inverter 5, a smoothing LC portion 6, a controller 7, and an AC voltage detector (second voltage detector) 8. The midpoint stabilizer 2, the midpoint capacitor 3, the voltage detector 4 and the inverter 5 are connected to the DC power supply 1 via a DC power output bus.

The power conversion device is an inverter device of a single-phase three-wire system. The power conversion device includes a neutral line as an O phase (neutral phase), a first voltage line as a U phase, and a second voltage line as a W phase, each phase being connected with a load. As described below, the neutral line adjusted to a midpoint potential, and the first voltage line and the second voltage line of which the respective voltage phases are controlled inversely, are exposed to the outside of the power conversion device.

When the power conversion device is, for example, a single-phase three-wire system of 100 V/200 V, a load of 200 V can be connected between the first voltage line and the second voltage line. Further, in the power conversion device, a load of 100 V can be connected, for example, between the first voltage line or the second voltage line and the neutral line.

The DC power supply 1 includes a DC power source 11 and a DC-DC converter 12. The DC power source 11 is a battery for outputting power of DC voltage, such as a solar cell, a fuel cell and a storage cell. The DC-DC converter 12 converts the DC voltage of the power supplied from the DC power source 11 into predetermine DC voltage. Note that the DC power supply 1 may only include the DC power source 11.

The midpoint stabilizer 2 functions to stabilize the midpoint potential as a potential of the neutral line. The midpoint stabilizer 2 is connected with the midpoint capacitor 3.

The midpoint capacitor 3 includes a first midpoint capacitor 31 and a second midpoint capacitor 32 connected in series, the first and second midpoint capacitors 31 and 32 each being connected to the DC power output bus and the O phase. The connecting point between the first midpoint capacitor 31 and the second midpoint capacitor 32 is an output of the O phase.

The first midpoint capacitor 31 and the second midpoint capacitor 32 each have a capacity depending on output power so as to adjust the potential in the O phase to a predetermined potential. For example, when the output power is 4 kW, the capacity of the first midpoint capacitor 31 is 3 mF, and the capacity of the second midpoint capacitor 32 is 3 mF. Thus, the first midpoint capacitor 31 and the second midpoint capacitor 32 have the same capacity. The midpoint stabilizer 2 regulates the power storage amount of each of the first midpoint capacitor 31 and the second midpoint capacitor 32 according to the control of the controller 7.

The voltage detector 4 detects conditions of the midpoint potential. The voltage detector 4 detects voltage V1 corresponding to the power storage amount of the first midpoint capacitor 31 by use of a voltage sensor 41. The voltage detector 4 also detects voltage V2 corresponding to the power storage amount of the second midpoint capacitor 32 by use of a voltage sensor 42. The voltage detector 4 detects the voltage V1 of the first midpoint capacitor 31 and the voltage V2 of the second midpoint capacitor 32 as the conditions of the midpoint potential so as to supply the voltage V1 and the voltage V2 to the controller 7.

The AC voltage detector 8 includes a voltage sensor 81 for detecting voltage Vuo across a smoothing capacitor 62 and a voltage sensor 82 for detecting voltage Vwo across a smoothing capacitor 64 in the smoothing LC portion 6. The voltage between the U phase and the O phase detected by the voltage sensor 81 is read by the controller 7. The voltage between the W phase and the O phase detected by the voltage sensor 82 is read by the controller 7.

The inverter 5 includes an arm in which the U phase is connected between switching elements 51 and 52 (a first switching element and a second switching element) and an arm in which the W phase is connected between switching elements 53 and 54 (a third switching element and a fourth switching element). The controller 7 switches the respective switching elements 51, 52, 53 and 54 of the inverter 5 between an ON state and OFF state.

The controller 7 monitors the voltages detected by the AC voltage detector 8. The controller 7 controls the switching elements 51, 52, 53 and 54 in a manner such that the voltage between the U phase and the O phase and the voltage between the W phase and the O phase are each adjusted to a desired voltage based on the respective voltages monitored. The controller 7 also controls the inverter 5 in a manner such that a voltage waveform of a desired frequency is output from between the U phase and the W phase. Accordingly, the inverter 5 supplies a pulse voltage subjected to PWM control to an LC filter between the U phase and the O phase, and supplies a pulse voltage subjected to PWM control to an LC filter between the W phase and the O phase.

The smoothing LC portion 6 includes a smoothing coil 61 placed between the U phase and the O phase and the smoothing capacitor 62. The smoothing LC portion 6 further includes a smoothing coil 63 placed between the W phase and the O phase and the smoothing capacitor 64.

The smoothing LC portion 6 uses the smoothing coil 61 and the smoothing capacitor 62 to smooth out the PWM voltage supplied from the switching elements 51 and 52 of the inverter 5. The smoothing LC portion 6 uses the smoothing coil 63 and the smoothing capacitor 64 to smooth out the PWM voltage supplied from the switching elements 53 and 54 of the inverter 5. The smoothing LC portion 6 thus outputs the voltage waveform of the desired frequency from between the U phase and the O phase and outputs, from between the W phase and the O phase, the voltage waveform reverse to the voltage waveform between the U phase and the O phase.

The controller 7 includes, for controlling the inverter 5, voltage command signal generation circuits 71 and 72, PWM controllers 73 and 74, and a carrier signal generator 75.

The voltage command signal generation circuit 71 supplies, to the PWM controller 73, a sine wave with desired frequency and amplitude as a voltage command signal.

The voltage command signal generation circuit 72 supplies, to the PWM controller 74, a voltage command signal of a sine wave reverse to the voltage command signal supplied from the voltage command signal generation circuit 71.

The carrier signal generator 75 supplies carrier signals to the respective PWM controllers 73 and 74.

The PWM controller 73 produces a PWM pattern by comparing the voltage command signal supplied from the voltage command signal generation circuit 71 with the carrier signal supplied form the carrier signal generator 75 so as to switch the switching elements 51 and 52 between an ON state and an OFF state. The PWM controller 73 is connected to the respective switching elements 51 and 52 via other signal lines. The PWM controller 73 can separately switch the switching elements 51 and 52 between the ON state and the OFF state.

The PWM controller 74 produces a PWM pattern by comparing the voltage command signal supplied from the voltage command signal generation circuit 72 with the carrier signal supplied form the carrier signal generator 75 so as to switch the switching elements 53 and 54 between an ON state and an OFF state. The PWM controller 74 is connected to the respective switching elements 53 and 54 via other signal lines. The PWM controller 74 can separately switch the switching elements 53 and 54 between the ON state and the OFF state. The controller 7 thus controls the inverter 5 so as to supply predetermined power to the U phase and the W phase.

The controller 7 also controls the midpoint stabilizer 2 so as to adjust the midpoint potential of the O phase based on the conditions of the midpoint potential detected by the voltage detector 4. The controller 7 regulates the power storage amount of the first midpoint capacitor 31 and the power storage amount of the second midpoint capacitor 32 so that the both amounts are substantially the same. The controller 7 thus stabilizes the midpoint potential in the O phase.

Here, in such a power supply system, when positive polarity and negative polarity of each of loads connected between the U phase and the O phase and between the W phase and the O phase are well-balanced and completely the same, the power storage amounts of the first midpoint capacitor 31 and the second midpoint capacitor 32 do not differ from each other, since the quantity of discharged electric charge and the quantity of charged electric charge for a one-cycle period in the first midpoint capacitor 31 and the second midpoint capacitor 32 are the same. Therefore, the difference between the power storage amount of the first midpoint capacitor 31 and the power storage amount of the second midpoint capacitor 32 does not increase.

For example, when a half-wave rectified load is connected between the U phase and the O phase, however, the quantity of discharged electric charge and the quantity of charged electric charge for the one-cycle period in the first midpoint capacitor 31 and the second midpoint capacitor 32 differ from each other because the balance between the positive polarity and the negative polarity of the load is lost. This causes a significant increase in difference between the power storage amount of the first midpoint capacitor 31 and the power storage amount of the second midpoint capacitor 32. As a result, the midpoint potential in the O phase fluctuates so as to cause waveform distortion.

However, the controller 7 controls the midpoint stabilizer 2 in a manner such that the power storage amount of the first midpoint capacitor 31 and the power storage amount of the second midpoint capacitor 32 are substantially the same. The controller 7 thus steadily stabilizes the midpoint potential in a manner such that the midpoint potential in the O phase is a midpoint of the voltage waveform between the U phase and the W phase.

At the same time, the controller 7 outputs the voltage waveform of the desired frequency from between the U phase and the O phase and outputs, from between the W phase and the O phase, the voltage waveform reverse to the voltage waveform between the U phase and the O phase. In other words, the controller 7 controls the total value of the voltage output from between the U phase and the O phase and the voltage output from between the W phase and the O phase in such a manner as to result in zero. Accordingly, the controller 7 can instantaneously prevent the midpoint potential from fluctuating in association with the activation of the inverter 5.

Figure 2:
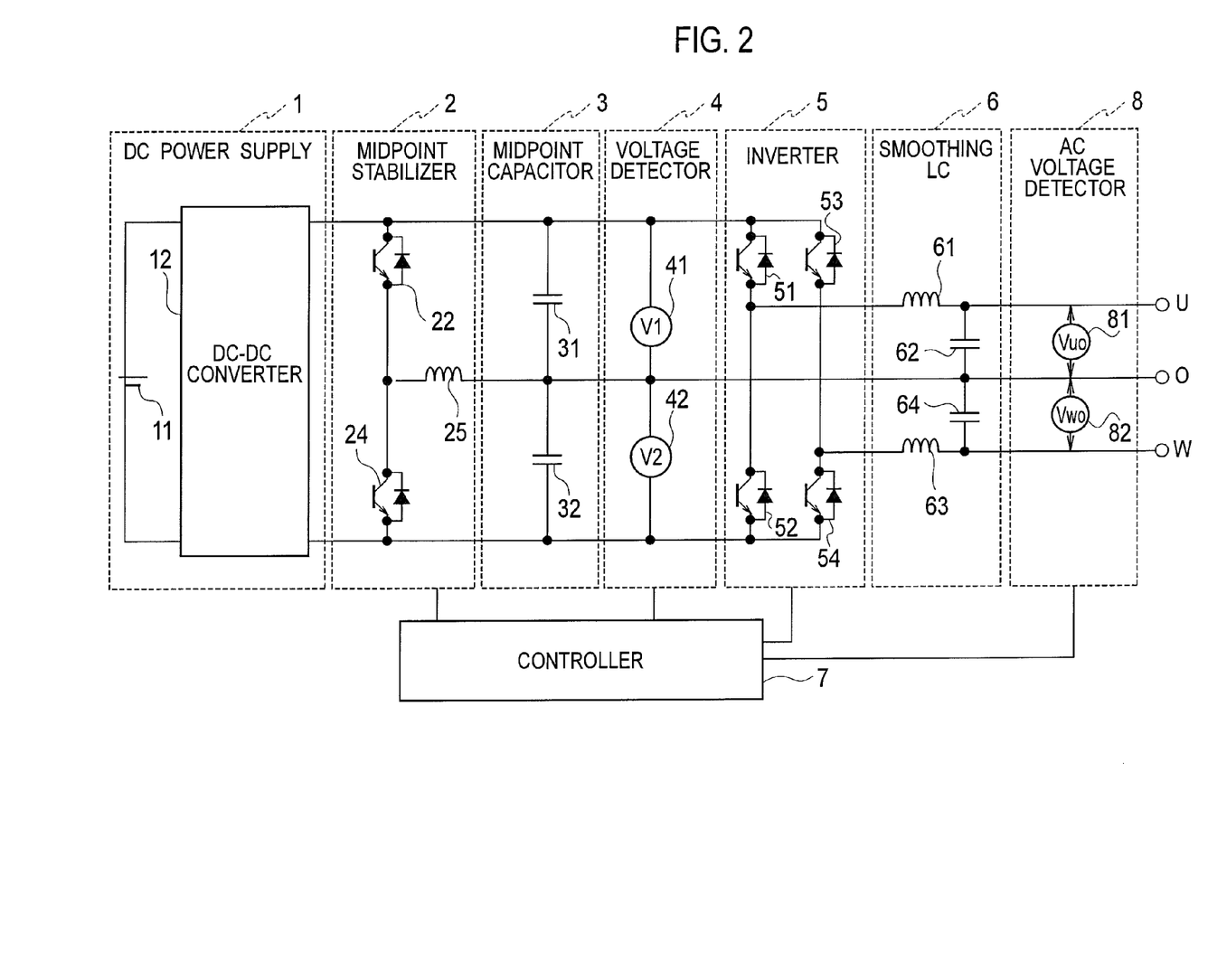
FIG. 2 is a circuit diagram showing a configuration of a midpoint stabilizer in the power supply system according to the embodiment of the present invention.

An example of the specific configuration of the midpoint stabilizer 2 is shown in FIG. 2. The midpoint stabilizer 2 includes a fifth switching element 22 connected between the DC power output bus and the O phase, a sixth switching element 24 connected between the DC power output bus and the O phase, and a reactor 25 connected to midpoints between the fifth switching element 22 and the sixth switching element 24 and between the first midpoint capacitor 31 and the second midpoint capacitor 32.

The fifth switching element 22 is connected between the DC power output bus and the O phase. The sixth switching element 24 is connected between the DC power output bus and the O phase. The reactor 25 is connected to the midpoints between the fifth switching element 22 and the sixth switching element 24 and between the first midpoint capacitor 31 and the second midpoint capacitor 32.

The controller 7 switches the fifth switching element 22 and the sixth switching element 24 between an open state and a closed state based on the conditions of the midpoint potential detected by the voltage detector 4 so as to regulate the power storage amounts of the first midpoint capacitor 31 and the second midpoint capacitor 32.

When the midpoint potential of the midpoint stabilizer 2 increases, the controller 7 repeatedly switches the sixth switching element 24 on the low side between an ON state and an OFF state. Once the sixth switching element 24 on the low side is turned ON, the midpoint potential acts on the reactor 25 so that the electric charge is discharged from the second midpoint capacitor 32, and electric energy is then stored in the reactor 25.

When the sixth switching element 24 is turned OFF, the electric energy stored in the reactor 25 is discharged to the DC power output bus via a body diode of the fifth switching element 22 on the high side. At this point, a difference voltage between the midpoint potential and the DC power output bus potential is applied to the reactor 25. Since the midpoint potential is substantially a midpoint of the DC power output bus potential, the voltage applied to the reactor 25 in the ON state of the switching element 24 is substantially the same as that in the OFF state of the switching element 24, and the polarities thereof are opposite to each other.

The controller 7 thus fixes a duty ratio, at approximately 50%, for switching the sixth switching element 24 between the ON state and the OFF state when electricity is discharged from the midpoint capacitor 3 in order to decrease the midpoint potential of the midpoint stabilizer 2. Accordingly, a current can flow through the reactor 25 in a critical mode, and switching power loss can be prevented by simple control so as to efficiently stabilize the midpoint potential of the O phase.

When the power storage amount of the midpoint capacitor 3 decreases, and the midpoint potential thus decreases, the controller 7 repeatedly switches the fifth switching element 22 on the high side between the ON state and the OFF state. Thus, the electricity is stored in the midpoint capacitor 3 so as to increase the midpoint potential of the midpoint stabilizer 2.

As described above, the power supply system according to the present embodiment can stabilize the midpoint potential of the O phase so as to prevent waveform distortion of the voltage waveform output from the inverter 5 caused in association with fluctuation of the midpoint potential of the O phase. Further, the power supply system stabilizes the midpoint potential of the O phase so as to prevent the risk that the midpoint shifts to a positive or negative power potential to result in inability to output when, for example, a half-wave rectified load is connected to the system.

Figure 3:
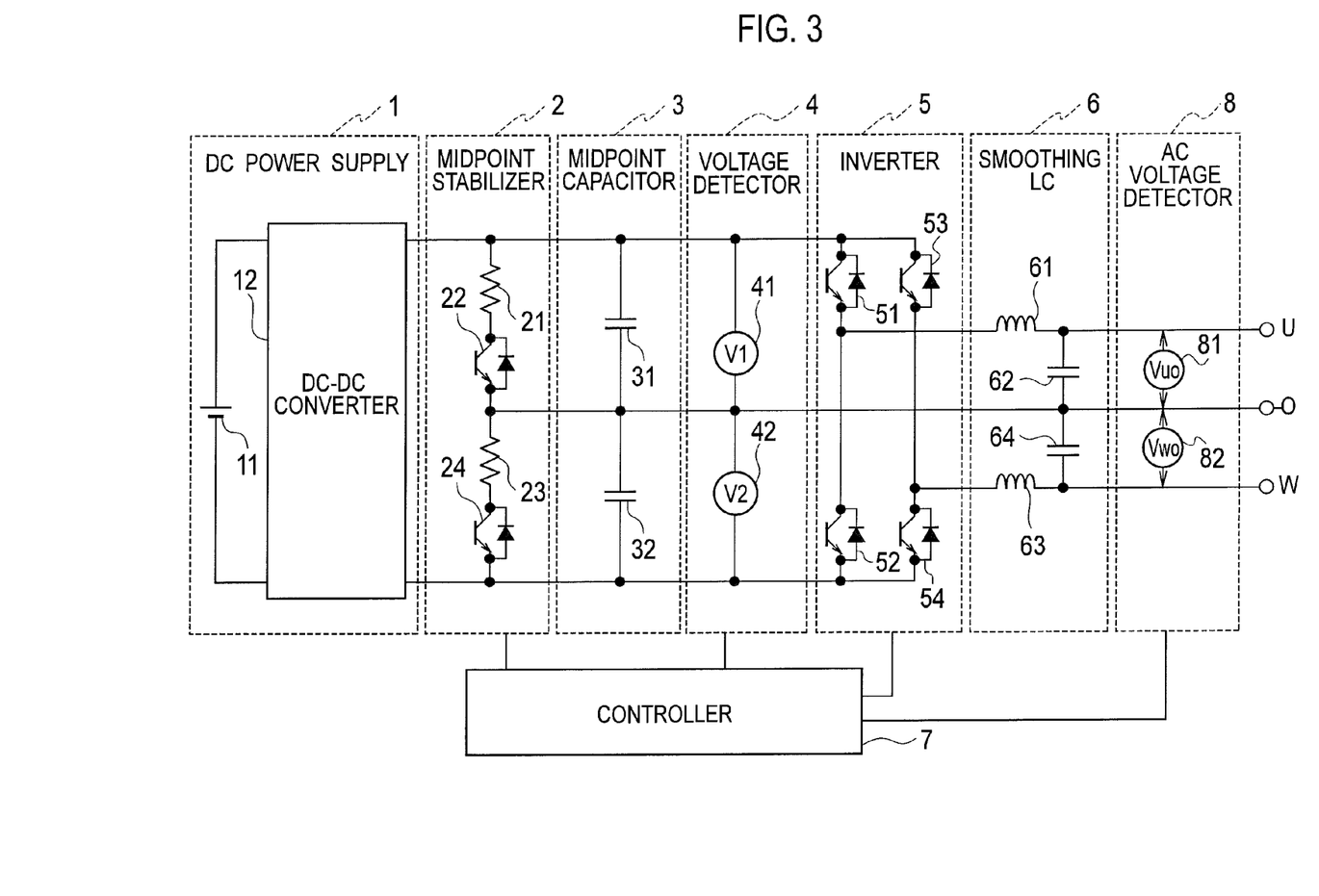
FIG. 3 is a circuit diagram showing another configuration of the midpoint stabilizer in the power supply system according to the embodiment of the present invention.

Another example of the specific configuration of the midpoint stabilizer 2 is shown in FIG. 3. The midpoint stabilizer 2 includes a first discharge portion and a second discharge portion. The first discharge portion includes a first resistance 21 and a seventh switching element 22 connected in parallel with the first midpoint capacitor 31. The second discharge portion includes a second resistance 23 and an eighth switching element 24 connected in parallel with the second midpoint capacitor 32.

The controller 7 activates the first discharge portion and the second discharge portion based on the conditions of the midpoint potential detected by the voltage detector 4, so as to regulate the power storage amounts of the first midpoint capacitor 31 and the second midpoint capacitor 32.

When the midpoint potential of the midpoint stabilizer 2 shifts from the midpoint of the voltage supplied from the DC power supply 1, the midpoint stabilizer 2 operates to recover the shift. The controller 7 then turns on the seventh switching element 22 and the eighth switching element 24 (to a conducting state). The electric charge stored in each of the first midpoint capacitor 31 and the second midpoint capacitor 32 is introduced to the first resistance 21 and the second resistance 23. The electric charge introduced is thus discharged.

For example, when the voltage V1 of the first midpoint capacitor 31 is higher than the voltage V2 of the second midpoint capacitor 32, the seventh switching element 22 is turned ON. The electric charge of the first midpoint capacitor 31 is thus discharged. When the voltage V2 of the second midpoint capacitor 32 is higher than the voltage V1 of the first midpoint capacitor 31, the eighth switching element 24 is turned ON. The electric charge of the second midpoint capacitor 32 is thus discharged.

According to the power supply system described above, the electric charge of the first midpoint capacitor 31 or the second midpoint capacitor 32 is discharged so as to prevent fluctuation of the midpoint potential of the midpoint stabilizer 2. For example, even if the balance of the power storage amounts between the first midpoint capacitor 31 and the second midpoint capacitor 32 is lost in the case where a half-wave rectified load is connected to the inverter 5, the lost balance can be recovered.

Here, in the configuration shown in FIG. 3, the electric charge excessively stored in the first midpoint capacitor 31 or the second midpoint capacitor 32 is discharged from the resistance 21 or 23 to correct the fluctuation of the midpoint potential. As a result, the power usage efficiency decreases. However, the midpoint stabilizer 2 can stabilize the midpoint potential with a very simple configuration. In addition, since the midpoint potential can be controlled without activating the midpoint stabilizer 2 at a high frequency, the midpoint potential can be stabilized with low noise.

(Other Embodiment)

Figure 4:
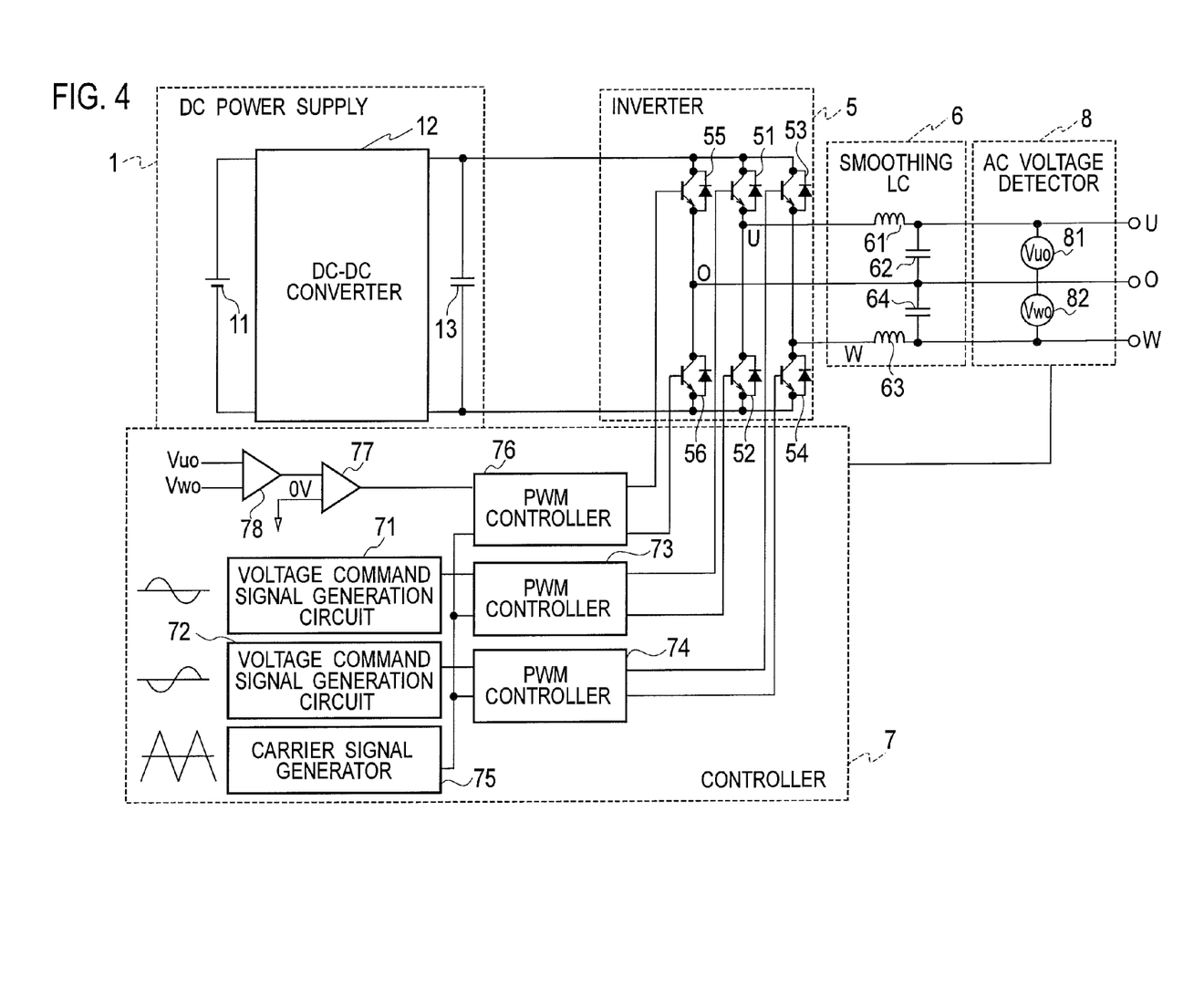
FIG. 4 is a circuit diagram showing a configuration of a power supply system according to another embodiment of the present invention.

Another power supply system capable of stabilizing the midpoint potential of the O phase is explained below with reference to FIG. 4.

This power supply system includes a DC capacitor 13 added to the DC power supply 1 in the power supply system shown in FIG. 1. The power supply system further includes switching elements 55 and 56 (a fifth switching element and a sixth switching element) connected to the O phase. The DC capacitor 13 is connected with the switching elements 55 and 56 (the fifth switching element and the sixth switching element) connected to the O phase. The AC voltage detector 8 is further provided on the rear side of the smoothing LC portion 6.

The controller 7 includes a PWM controller 76 connected to the switching elements 55 and 56, an error amplifier 77, and a differential amplifier 78.

The AC voltage detector 8 includes the voltage sensor 81 for detecting the voltage Vuo (first voltage) across the smoothing capacitor 62, and the voltage sensor 82 for detecting the voltage Vwo (second voltage) across the smoothing capacitor 64 in the smoothing LC portion 6.

As in the case of the embodiment described above, the controller 7 monitors the voltages detected by the AC voltage detector 8. The controller 7 controls the switching elements 51, 52, 53 and 54 in a manner such that the voltage between the U phase and the O phase and the voltage between the W phase and the O phase are each adjusted to a desired voltage based on the respective voltages monitored. The controller 7 also controls the inverter 5 in a manner such that a voltage waveform of a desired frequency is output from between the U phase and the W phase.

Further, the controller 7 outputs, from the differential amplifier 78, a difference between the voltage Vuo detected by the voltage sensor 81 and the voltage Vwo detected by the voltage sensor 82. This difference output from the differential amplifier 78 is compared with 0 V by the error amplifier 77

The error amplifier 77 supplies the difference between the voltage Vuo and the voltage Vwo as an error from 0 V to the PWM controller 76.

The PWM controller 76 supplies a PWM signal for switching the switching elements 55 and 56 between an ON state and an OFF state in order to suppress the error output from the error amplifier 77.

The controller 7 thus controls the O-phase potential in such a manner as to be a midpoint between the U-phase potential and the W-phase potential. The controller 7 further controls the output waveform between the U phase and the O phase and the output waveform between the W phase and the O phase (the waveform reverse to the U phase).

The controller 7 controls the switching elements 51 and 52 of the U phase and the switching elements 53 and 54 of the W phase so as to output the waveform as a sine wave of a desired frequency from between the U phase and the O phase and output the waveform reverse to the waveform of the U phase from between the W phase and the O phase. The controller 7 thus immediately controls the total value of the voltage output from between the U phase and the O phase and the voltage output from between the W phase and the O phase in such a manner as to result in zero. The controller 7 also controls the switching elements 55 and 56 and controls the midpoint potential in such a manner as to be steadily a midpoint potential of the bus voltage.

Since the power supply system described above controls the midpoint potential of the O phase and controls the output waveforms between the U phase and O phase and between the W phase and the O phase, the power supply system is not required to include, for example, a transformer for the DC power source 11. In addition, the power supply system described above can prevent fluctuation of the midpoint potential so as to supply electricity to any kinds of loads, such as a half-wave rectified load, connected thereto.

The embodiments described above are examples of the present invention. Therefore, the present invention is not limited to the embodiments described above, and it will be apparent to those skilled in the art that various modifications and improvements can be made depending on designs without departing from the scope of the present invention.

The entire content of Japanese Patent Application No. P2012-233792 (filed on Oct. 23, 2012) is herein incorporated by reference.

INDUSTRIAL APPLICABILITY

The present invention includes a midpoint stabilizer for regulating a power storage amount of each of a first midpoint capacitor and a second midpoint capacitor and controls the midpoint stabilizer to adjust a midpoint potential of a neutral line based on conditions of the midpoint potential of the neutral line, so as to deal with various types of loads and decrease waveform distortion.

REFERENCE SIGNS LIST

2 MIDPOINT STABILIZER
3 MIDPOINT CAPACITOR
4 VOLTAGE DETECTOR
5 INVERTER
7 CONTROLLER
8 AC VOLTAGE DETECTOR
21, 23 RESISTANCE
22 FIFTH SWITCHING ELEMENT
24 SIXTH SWITCHING ELEMENT
25 REACTOR
31 FIRST MIDPOINT CAPACITOR
32 SECOND MIDPOINT CAPACITOR
41, 42, 81, 82 VOLTAGE SENSOR
51, 52, 53, 54 SWITCHING ELEMENT (FIRST SWITCHING ELEMENT, SECOND SWITCHING ELEMENT, THIRD SWITCHING ELEMENT, FOURTH SWITCHING ELEMENT)
71, 72 VOLTAGE COMMAND SIGNAL GENERATION CIRCUIT
73, 74, 76 PWM CONTROLLER
75 CARRIER SIGNAL GENERATOR
77 ERROR AMPLIFIER
78 DIFFERENTIAL AMPLIFIER

The invention claimed is:

1. A power conversion device comprising:
an inverter including a first switching element and a second switching element for outputting a voltage between a first voltage line and a neutral line in a single-phase three-wire system, and a third switching element and a fourth switching element for outputting a voltage between a second voltage line and the neutral line in the single-phase three-wire system;
a first midpoint capacitor connected to a DC power output bus and the neutral line;
a second midpoint capacitor connected to the DC power output bus and the neutral line;
a first voltage detector configured to detect a condition of a midpoint potential in the neutral line at a connecting point between the first midpoint capacitor and the second midpoint capacitor;
a second voltage detector configured to detect the voltage between the first voltage line and the neutral line and the voltage between the second voltage line and the neutral line;
a midpoint stabilizer configured to regulate a power storage amount of each of the first midpoint capacitor and the second midpoint capacitor; and
a controller configured to control the first switching element, the second switching element, the third switching element and the fourth switching element so as to supply a desired voltage from between the first voltage line and the neutral line and a desired voltage from between the second voltage line and the neutral line based on the respective voltages detected by the second voltage detector, and control the midpoint stabilizer so as to adjust the midpoint potential in the neutral line based on the condition of the midpoint potential detected by the first voltage detector,
wherein the midpoint stabilizer includes a fifth switching element and a sixth switching element connected to the DC power output bus, and a reactor connected to midpoints between the fifth switching element and the sixth switching element and between the first midpoint capacitor and the second midpoint capacitor,
the controller turns on the sixth switching element on a low side when the midpoint potential detected by the first voltage detector increases so as to discharge an electric charge of the second midpoint capacitor and store the electric charge in the reactor, and turns off the sixth switching element so as to discharge the electric charge stored in the reactor to the DC power output bus via the fifth switching element on a high side, and the controller turns on the fifth switching element on the high side when the midpoint potential detected by the first voltage detector decreases so as to store the electric charge from the DC power output bus in the reactor, and turns off the fifth switching element so as to store the electric charge stored in the reactor in each of the first midpoint capacitor and the second midpoint capacitor.

2. A power conversion device comprising:

an inverter including a first switching element and a second switching element for outputting a voltage between a first voltage line and a neutral line in a single-phase three-wire system, and a third switching element and a fourth switching element for outputting a voltage between a second voltage line and the neutral line in the single-phase three-wire system;

a first midpoint capacitor connected to a DC power output bus and the neutral line;

a second midpoint capacitor connected to the DC power output bus and the neutral line;

a first voltage detector configured to detect a condition of a midpoint potential in the neutral line at a connecting point between the first midpoint capacitor and the second midpoint capacitor;

a second voltage detector configured to detect the voltage between the first voltage line and the neutral line and the voltage between the second voltage line and the neutral line;

a midpoint stabilizer configured to regulate a power storage amount of each of the first midpoint capacitor and the second midpoint capacitor; and a controller configured to control the first switching element, the second switching element, the third switching element and the fourth switching element so as to supply a desired voltage from between the first voltage line and the neutral line and a desired voltage from between the second voltage line and the neutral line based on the respective voltages detected by the second voltage detector, and control the midpoint stabilizer so as to adjust the midpoint potential in the neutral line based on the condition of the midpoint potential detected by the second voltage detector, wherein the midpoint stabilizer includes a first discharge portion including a first resistance and a seventh switching element connected in parallel with the first midpoint capacitor and a second discharge portion including a second resistance and an eighth switching element connected in parallel with the second midpoint capacitor, and the controller turns on the seventh switching element and the eighth switching element when the midpoint potential detected by the first voltage detector shifts so as to introduce a stored electric charge to the first resistance and the second resistance to discharge the electric charge and regulate the power storage amount of each of the first midpoint capacitor and the second midpoint capacitor.

3. The power conversion device according to claim 1, wherein:

the controller controls the midpoint stabilizer in a manner such that the midpoint potential in the neutral line is a midpoint of a voltage waveform between the first voltage line and the second voltage line; and the controller controls the inverter so as to output a voltage waveform of a desired frequency from between the first voltage line and the second voltage line.

4. The power conversion device according to claim 3, wherein the controller controls the inverter in a manner such that a total value of the voltage output from between the first voltage line and the neutral line and the voltage output from between the second voltage line and the neutral line results in zero.

5. The power conversion device according to claim 3, wherein the controller controls the midpoint stabilizer in a manner such that the midpoint potential in the neutral line is a midpoint of a desired voltage of the DC power output bus.

6. The power conversion device according to claim 1, wherein the first midpoint capacitor and the second midpoint capacitor each have a capacity depending on output power of the inverter so as to adjust a potential in the neutral line to a predetermined potential.

7. A power conversion device comprising:

an inverter including a first switching element and a second switching element for outputting a voltage between a first voltage line and a neutral line in a single-phase three-wire system, a third switching element and a fourth switching element for outputting a voltage between a second voltage line and the neutral line in the single-phase three-wire system, and a fifth switching element and a sixth switching element connected to the neutral line and a DC power output bus;

a voltage detector configured to detect a first voltage between the first voltage line and the neutral line and a second voltage between the second voltage line and the neutral line; and a controller configured to control the first switching element, the second switching element, the third switching element and the fourth switching element so as to supply a desired voltage from between the first voltage line and the neutral line and a desired voltage from between the second voltage line and the neutral line based on the respective voltages detected by the voltage detector, and control the fifth switching element and the sixth switching element so as to adjust the midpoint potential in the neutral line based on the first voltage and the second voltage detected by the voltage detector.

* * * * *